US011394972B2

(12) United States Patent
Egilmez et al.

(10) Patent No.: US 11,394,972 B2
(45) Date of Patent: Jul. 19, 2022

(54) METHOD AND DEVICE FOR ENCODING/DECODING VIDEO SIGNAL BY USING OPTIMIZED CONVERSION BASED ON MULTIPLE GRAPH-BASED MODEL

(71) Applicant: LG Electronics Inc., Seoul (KR)

(72) Inventors: Hilmi E. Egilmez, San Jose, CA (US); Jana Ehmann, San Jose, CA (US); Onur G. Guleryuz, San Jose, CA (US)

(73) Assignee: LG Electronics Inc., Seoul (KR)

( * ) Notice: Subject to any disclaimer, the term of this patent is extended or adjusted under 35 U.S.C. 154(b) by 608 days.

(21) Appl. No.: 15/932,206

(22) PCT Filed: Aug. 19, 2016

(86) PCT No.: PCT/KR2016/009189
§ 371 (c)(1),
(2) Date: Feb. 16, 2018

(87) PCT Pub. No.: WO2017/030418
PCT Pub. Date: Feb. 23, 2017

(65) Prior Publication Data
US 2020/0288129 A1 Sep. 10, 2020

Related U.S. Application Data

(60) Provisional application No. 62/207,337, filed on Aug. 19, 2015.

(51) Int. Cl.
*H04N 19/12* (2014.01)
*H04N 19/159* (2014.01)
(Continued)

(52) U.S. Cl.
CPC ........... *H04N 19/12* (2014.11); *H04N 19/159* (2014.11); *H04N 19/18* (2014.11); *H04N 19/61* (2014.11)

(58) Field of Classification Search
CPC .. H04N 19/176; H04N 19/159; H04N 19/593; H04N 19/11; H04N 19/105; H04N 19/625; H04N 19/12
See application file for complete search history.

(56) References Cited

U.S. PATENT DOCUMENTS

2009/0087122 A1* 4/2009 Xu .......................... G06F 16/71
382/277
2012/0127003 A1* 5/2012 Shibahara ............ H04N 19/129
341/87

(Continued)

FOREIGN PATENT DOCUMENTS

CN 104702961 6/2015
KR 10-2010-0079514 7/2010
(Continued)

OTHER PUBLICATIONS

Extended European Search Report in European Appln. No. 16837360.3, dated Feb. 20, 2019, 9 pages.
(Continued)

*Primary Examiner* — Daniel Chang
(74) *Attorney, Agent, or Firm* — Fish & Richardson P.C.

(57) ABSTRACT

The present invention, with respect to a method of processing video data, provides a method of processing video data, provides a method characterized by comprising the steps of: performing a clustering for the video data; generating at least one data cluster as a result of the clustering; generating at least one Graph laplacian matrix corresponding to the at least one data cluster; performing conversion optimization on the basis of multiple graph-based models, wherein the multiple graph-based models respectively include at least one graph laplacian matrix; and generating an optimized conversion matrix according to the results of performing the conversion optimization.

3 Claims, 16 Drawing Sheets

(51) Int. Cl.
*H04N 19/18* (2014.01)
*H04N 19/61* (2014.01)

(56) References Cited

U.S. PATENT DOCUMENTS

| | | | | |
|---|---|---|---|---|
| 2012/0201303 A1* | 8/2012 | Yang | H04N 19/46 | 375/240.14 |
| 2013/0266064 A1* | 10/2013 | Zhang | H04N 19/463 | 375/240.12 |
| 2013/0272401 A1* | 10/2013 | Seregin | H04N 19/13 | 375/240.12 |
| 2013/0272422 A1* | 10/2013 | Lee | H04N 19/122 | 375/240.18 |
| 2014/0016874 A1* | 1/2014 | Francois | H04N 19/593 | 382/236 |
| 2014/0092978 A1* | 4/2014 | Bugdayci | H04N 19/30 | 375/240.16 |
| 2014/0105290 A1* | 4/2014 | Kwon | H04N 19/50 | 375/240.12 |
| 2014/0247866 A1* | 9/2014 | Lee | H04N 19/18 | 375/240.02 |
| 2014/0247868 A1* | 9/2014 | Oh | H04N 19/463 | 375/240.03 |
| 2014/0254674 A1* | 9/2014 | Lee | H04N 19/139 | 375/240.12 |
| 2014/0254675 A1* | 9/2014 | Lee | H04N 19/159 | 375/240.12 |
| 2014/0269915 A1* | 9/2014 | Lee | H04N 19/46 | 375/240.18 |
| 2016/0073114 A1* | 3/2016 | Kawamura | H04N 19/107 | 375/240.03 |
| 2017/0324643 A1* | 11/2017 | Seregin | H04N 19/16 | |
| 2018/0302631 A1* | 10/2018 | Chiang | H04N 19/124 | |
| 2020/0288129 A1* | 9/2020 | Egilmez | H04N 19/18 | |

FOREIGN PATENT DOCUMENTS

| | | |
|---|---|---|
| KR | 10-2011-0093532 | 8/2011 |
| KR | 10-2011-0135787 | 12/2011 |
| KR | 10-2015-0046353 | 4/2015 |

OTHER PUBLICATIONS

Cha Zhang et al: "Analyzing the Optimality of Predictive Transform Coding Using Graph-Based Models", XP 011476604, IEEE Signal Processing Letters, Jan. 2013, 20(1): 106-109.

Hu Wei et al: "Multiresolution Graph Fourier Transform for Compression of Piecewise Smooth Images", XP 011569005, IEEE Transactions On Image Processing, Jan. 2015, 24(1): 419-433.

Xin Zhao et al: "Rate-distortion optimized transform for intra-frame coding", XP 031743031, dated Mar. 14, 2010, 4 pages.

Pavez et al., "GTT: Graph Template Transforms with Applications to Image Coding," Aug. 2015, IEEE, vol. 1, 7 pages.

International Search Report in International Application No. PCT/KR2016/009189, dated Dec. 1, 2016, 10 pages.

Office Action in Chinese Appln. No. 201680048639.4, dated Aug. 13, 2021, 19 pages (with English translation).

* cited by examiner (a)

(b)

METHOD AND DEVICE FOR ENCODING/DECODING VIDEO SIGNAL BY USING OPTIMIZED CONVERSION BASED ON MULTIPLE GRAPH-BASED MODEL

CROSS-REFERENCE TO RELATED APPLICATIONS

This application is a National Stage application under 35 U.S.C. § 371 of International Application No. PCT/KR2016/009189, filed Aug. 19, 2016, which claims the benefit of U.S Application No. 62/207,337, filed on Aug. 19, 2015. The disclosures of the prior applications are incorporated by reference in their entirety.

TECHNICAL FIELD

The present invention relates to a method and device for encoding/decoding a video signal using a graph-based transform. Specifically, the present invention relates to a technique of generating an optimized transform matrix according to multiple graph-based models.

BACKGROUND ART

Next-generation video content will have features of high spatial resolution, a high frame rate, and high dimensionality of scene representation. Processing such content will result in a tremendous increase in terms of memory storage, memory access rate, and processing power. Therefore, there is a need to design a coding tool for processing next generation video content more efficiently.

In particular, a graph is a data representation form useful for describing information of relationship between pixels, and a graph-based signal processing method for performing processing by expressing information of relationship between pixels by a graph. The graph-based signal processing may generalize concepts such as sampling, filtering, transforming, and the like, using graphs in which each signal sample represents a vertex and signal relationships are represented by graph edges with positive weights. Therefore, a more efficient graph-based signal processing method is required in various application fields, as well as in the field of video compression.

Also, regarding signal processing and machine learning applications, transforms are generally obtained based on secondary statistics (e.g., a covariance matrix) of a single model. In practice, however, a single model assumption cannot readily respond to the overall change in data. Thus, there is a need to design robust transforms more appropriate for certain data.

DISCLOSURE

Technical Problem

An aspect of the present invention provides a method for designing a robust transform using graph-based representations.

Another aspect of the present invention provides a method of generating an optimized transform applicable to a range of statistical graph models.

Another aspect of the present invention provides a method of designing multiple graph-based models for designing robust transforms.

Technical Solution

The present invention is to design robust transform using at least one graph laplacian matrix corresponding to a data cluster.

The present invention also provides a method of generating multiple graph-based models for designing an adaptive transform.

Also, the present invention also is to generate multiple graph-based models by performing data clustering based on a prediction mode.

Also, the present invention is to generate an optimized transform using a specified metric that minimizes a squared sum of off-diagonal elements.

Advantageous Effects

The present invention provides a method for designing a robust transform using graph-based representation, whereby generating an optimized transform applicable to a range of statistical graph models.

In general, transforms designed for individual models are not appropriate for general use, and the present invention enables construction of an adaptive transform for different models.

A data model is generally approximated by a single model, and if data is out of the assumption of the data model, a corresponding transform may not be appropriate for particular data. Thus, the present invention enables designing a robust transform regarding model uncertainty by considering different models.

BEST MODES

Figure 1:
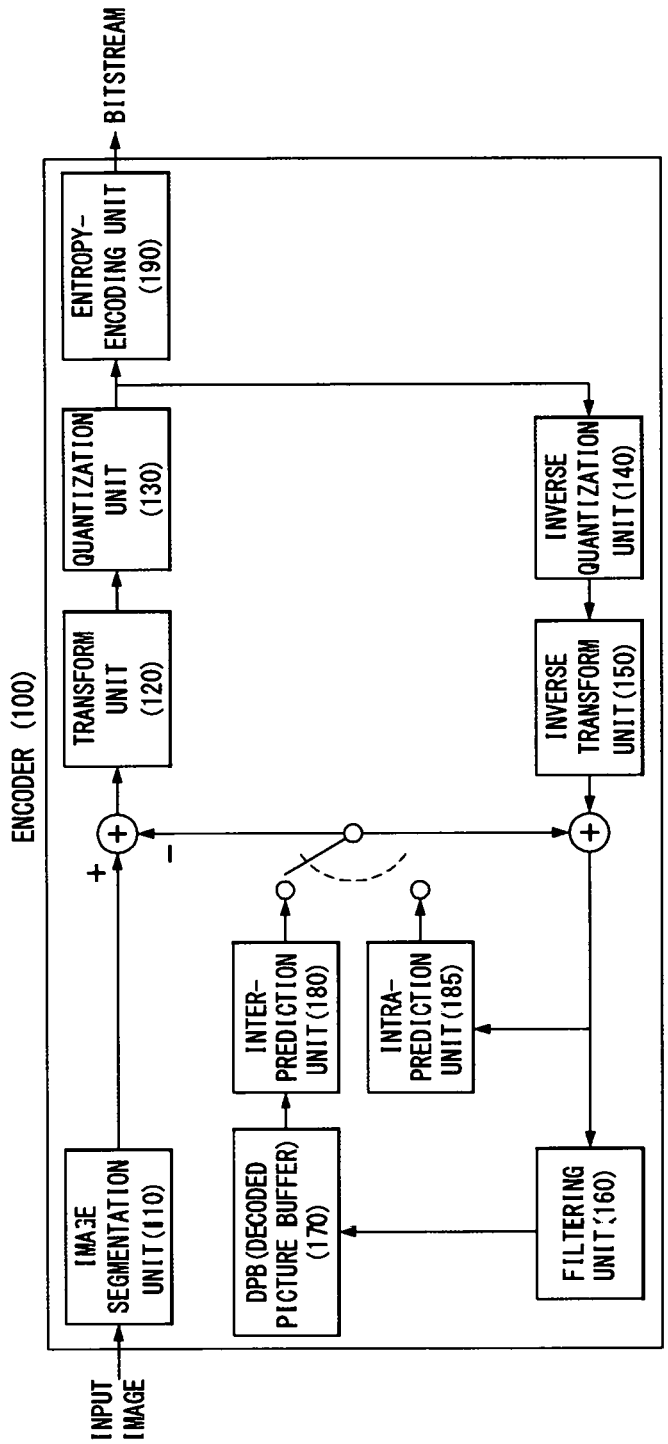
FIG. 1 shows a schematic block diagram of an encoder for encoding a video signal, in accordance with one embodiment of the present invention.

The present invention provides a method for processing video data, including: performing a clustering on the video data; generating at least one data cluster as a result of the clustering; generating at least one graph laplacian matrix corresponding to the at least one data cluster; performing transform optimization based on multiple graph-based models, each of the multiple graph-based models including at least one graph laplacian matrix; and generating an optimized transform matrix according to a result of performing the transform optimization.

Also, in the present invention, the clustering may be performed based on a prediction mode.

Also, in the present invention, when the prediction mode is an intra-prediction mode, the at least one data cluster may represent intra-residual data for the intra-prediction mode.

Also, in the present invention, each of the multiple graph-based models may be generated for the Intra-prediction mode.

Also, in the present invention, when the prediction mode is an inter-prediction mode, the at least one data cluster may represent inter-residual data for the inter-prediction mode Also, in the present invention, the transform optimization may be performed based on a specified metric, and the specified metric may minimize a squared sum of off-diagonal elements.

Also, in the present invention, the transform optimization may include: initializing the transform matrix; selecting two basic vectors of the transform matrix; and updating the two basic vectors based on the specified metric.

Also, the present invention provides a device for processing video data, comprising: a clustering unit configured to perform a clustering on the video data to generate at least one data cluster; a graph signal modeling unit configured to generate a graph laplacian matrix corresponding to the at least one data cluster; and a transform optimizing unit configured to perform a transform optimization based on multiple graph-based models and generating an optimized transform matrix, wherein each of the multiple graph-based models includes at least one graph-based laplacian.

Also, in the present invention, the transform optimizing unit may include: a transform initializing unit configured to initialize the transform matrix; a transform selecting unit configured to select two basic vectors of the transform matrix; and a transform updating unit configured to update the two basic vectors based on a specified metric.

MODE FOR INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process. Further, partitioning, decomposition, splitting, and segmentation, etc. may also be appropriately substituted with each other for each coding process.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure. The present invention is not limited to the definitions of the terms. In this specification, for convenience of illustration, the term "coding unit" is employed as a unit used in a process of encoding or decoding a video signal. However, the present invention is not limited thereto. Another process unit may be appropriately selected based on contents of the present disclosure.

The encoder 100 may generate a residual signal by subtracting a prediction signal output from the inter-prediction unit 180 or intra-prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The transform unit 120 may use a graph-based signal processing scheme for processing inter-pixel relationship information by representing it as a graph. For example, the transform unit 120 may include a graph-based transform unit, and the graph-based transform unit may generate at least one data cluster for video data, generate at least one graph laplacian matrix corresponding thereto, and perform a transform optimization based on multiple graph-based models including the at least one graph laplacian matrix.

The graph-based transform unit in accordance the present invention may be embodied as a separate functional unit. In this case, the graph-based transform unit may be located in front of the transform unit 120. However the present invention is not limited thereto.

The quantization unit 130 may quantize the transform coefficient and transmits the quantized coefficient to the entropy-encoding unit 190. The entropy-encoding unit 190 may entropy-code the quantized signal and then output the entropy-coded signal as bit streams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra-prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction The prediction signal generated via the inter-prediction unit 180 or the intra-prediction unit 185 may be used to generate the reconstructed signal or used to generate the residual signal.

Figure 2:
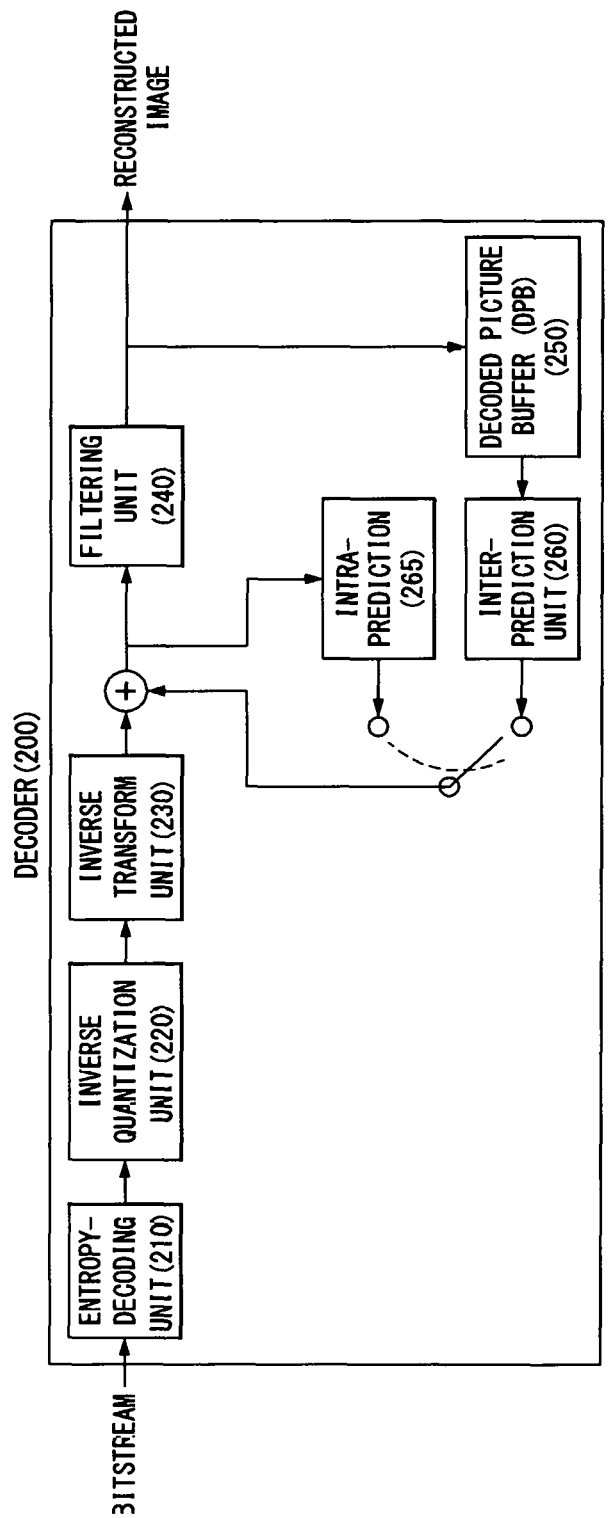
FIG. 2 shows a schematic block diagram of a decoder for decoding a video signal, in accordance with one embodiment of the present invention.

FIG. 2 shows a schematic block diagram of a decoder for decoding a video signal, in accordance with one embodiment of the present invention.

Referring to FIG. 2, a decoder 200 may include an entropy-decoding unit 210, an inverse quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

In an embodiment of the present invention, the decoder or the entropy decoding unit 210 may receive a template index. Here, the template index may correspond to a transform matrix optimized based on multiple graph-based models.

The entropy-decoded template index may be transmitted to the inverse quantization unit 220 where the index may be inversely quantized. The inversely quantized index may be transmitted to the inverse transform unit 230 for further use.

The inverse quantization unit 220 may obtain a transform coefficient from the entropy-decoded signal using quantization step size information. In this case, the obtained transform coefficient may be associated with the operations of the transform unit 120 as described above with reference to FIG. 1.

The inverse transform unit 230 may inverse-transform the transform coefficient to obtain a residual signal.

In an embodiment of the present invention, the inverse transform unit 230 may obtain a graph-based transform matrix for the target unit corresponding to the template index, and may perform inverse transform on the target unit using an inverse transform matrix derived from the graph-based transform matrix. Here, the graph-based transform matrix may represent a transform matrix optimized based on the number of multiple graph-based models.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

Figure 3:
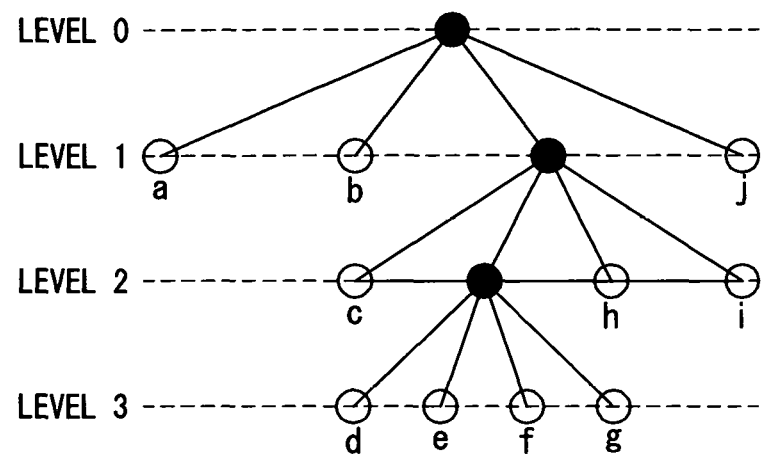
FIG. 3 is a diagram for illustrating a segmentation structure of a coding unit, in accordance with one embodiment of the present invention.
Figure 3:
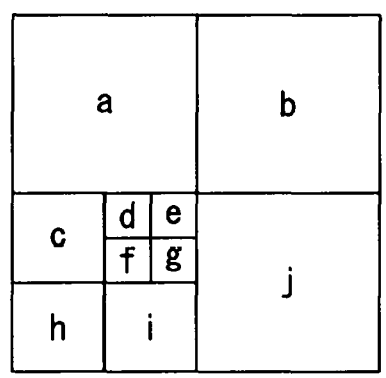

FIG. 3 is a diagram for illustrating a segmentation structure of a coding unit, in accordance with one embodiment of the present invention.

The encoder may segmentalize or divide one image or picture into a rectangular CTU (Coding Tree Unit). Then, the encoder may sequentially encode CTUs one by one according to a raster scan order.

For example, a size of the CTU may be set to 64×64, 32×32, or 16×16. However, the present invention is not limited thereto. The encoder may select the size of the CTU based on a resolution of the input image or characteristics of the input image, etc. The CTU may include a CTB (coding tree block) for a luma component and a CTB (coding tree block) for corresponding two chroma components.

A single CTU may be decomposed into a quadtree (hereinafter, referred to as 'QT') structure. For example, one CTU may be divided into four units, each unit having a square shape, with a length of each side thereof decreasing by one half. This decomposition or division of the QT structure may be performed recursively.

Referring to FIG. 3, a root node of the QT may be related to the CTU. The QT may be partitioned until a leaf node is reached. In this case, the leaf node may be referred to as a coding unit (CU).

The CU may refer to a base unit for a coding process of the input image, for example, a base unit for intra/inter-predictions. The CU may include a CB for a luma component and a CB for two chroma components corresponding to the luma component. For example, the size of the CU may be set to 64×64, 32×32, 16×16, or 8×8. However, the present invention is not limited thereto. In the case of a high-resolution image, the size of the CU may be increased or varied.

Referring to FIG. 3, the CTU may correspond to the root node, and may have the smallest depth (that is, level 0). Depending on the characteristics of the input image, the CTU may not be divided. In this case, the CTU corresponds to the CU.

The CTU may be decomposed into a QT form. As a result, sub-nodes, each having a depth of level 1, may be generated. Among the sub-nodes, each having a depth of level 1, a sub-node (i.e., a leaf node) that is not further divided corresponds to a CU. For example, in FIG. 3(b), each of the coding units CU(a), CU (b), and CU (j) corresponding to nodes a, b and j respectively are partitioned one time in the CTU and thus has a depth of level 1.

Among the sub-nodes, each having a depth of level 1, at least one sub-node may be further segmentalized into a QT form. Among the sub-nodes, each having a depth of level 2, a sub-node (i.e., a leaf node) that is not further divided corresponds to a CU. For example, in FIG. 3(b), each of the coding units CU(c), CU (h), and CU (i) corresponding to nodes c, h and i respectively are partitioned two times in the CTU and thus has a depth of level 2.

Further, among the sub-nodes, each having a depth of level 2, at least one sub-node may be further segmentalized into a QT form. Among the sub-nodes, each having a depth of level 3, a sub-node (i.e., a leaf node) that is not further divided corresponds to a CU. For example, in FIG. 3(b), each of the coding units CU(d), CU (e), CU(f) and CU (g) corresponding to nodes d, e, f and g respectively are partitioned three times in the CTU and thus has a depth of level 3.

The encoder may determine a maximum or minimum size of the CU based on the characteristics (for example, resolution) of the video image or the efficiency of coding. Information on the maximum or minimum size and/or information used for deriving the maximum or minimum size may be included in the bitstream. Hereinafter, a CU having a maximum size may be referred to as a LCU (Largest Coding Unit), while a CU having a minimum size may be referred to as a SCU (Smallest Coding Unit).

In addition, a CU having a tree structure may have a predetermined maximum depth information (or maximum level information) and may be hierarchically divided. Further, each divided CU may have depth information. The depth information indicates the number and/or degree of divisions of the CU. Thus, the depth information may include information about the size of the CU.

The LCU is divided into a QT form. Therefore, the size of the SCU may be obtained using the LCU size and the maximum depth information of the tree. Conversely, the size of the SCU and the maximum depth information of the tree may be used to determine the size of the LCU.

For a single CU, information indicating whether or not the CU is divided may be transmitted to the decoder. For example, the information may be defined as a segmentation flag and may be represented by a syntax element "split_cu_flag". The segmentation flag may be included in all CUs except a SCU. For example, when the value of the segmentation flag is '1', the corresponding CU is further divided into four CUs. When the value of the segmentation flag is '0', the corresponding CU is not further divided, and, then, the coding process for the corresponding CU may be performed.

Although, in the embodiment as shown in FIG. 3, the QT structure described above is applied to the CU division by way of example, the QT structure described above may be equally applied to TU (transform unit) division, where the TU is a base unit for performing transform.

The TU may be hierarchically partitioned from the CU to be coded into a QT structure. For example, the CU may correspond to a root node of the tree for the transform unit TU.

The TU is divided into a QT structure. Thus, each of TUs divided from the CU may be further divided into smaller sub-TUs. For example, a size of the TU may be set to 32×32, 16×16, 8×8, or 4×4. However, the present invention is not limited thereto. For high-resolution images, the size of the TU may be larger or may vary.

For a single TU, information indicating whether or not the TU is divided may be transmitted to the decoder. For example, the information may be defined as a segmentation transform flag and may be represented by a syntax element "split_transform flag".

The segmentation transform flag may be included in all TUs except a STU (smallest TU). For example, when the value of the segmentation transform flag is '1', the corresponding TU is further divided into four TUs. When the value of the segmentation transform flag is '0', the corresponding TU is not further divided, and, then, the coding process for the corresponding TU may be performed.

As described above, CU is a base unit for the coding process in which the intra-prediction or inter-prediction is performed. In order to more effectively code the input image, the CU may be divided into PUs (Prediction Units).

PU is a base unit forming a prediction block. It is possible to generate different prediction blocks on a PU basis even within a single CU. The PU may be divided differently depending on whether an intra-prediction mode or an inter-prediction mode is used as a coding mode for a CU to which the PU belongs.

Figure 4:
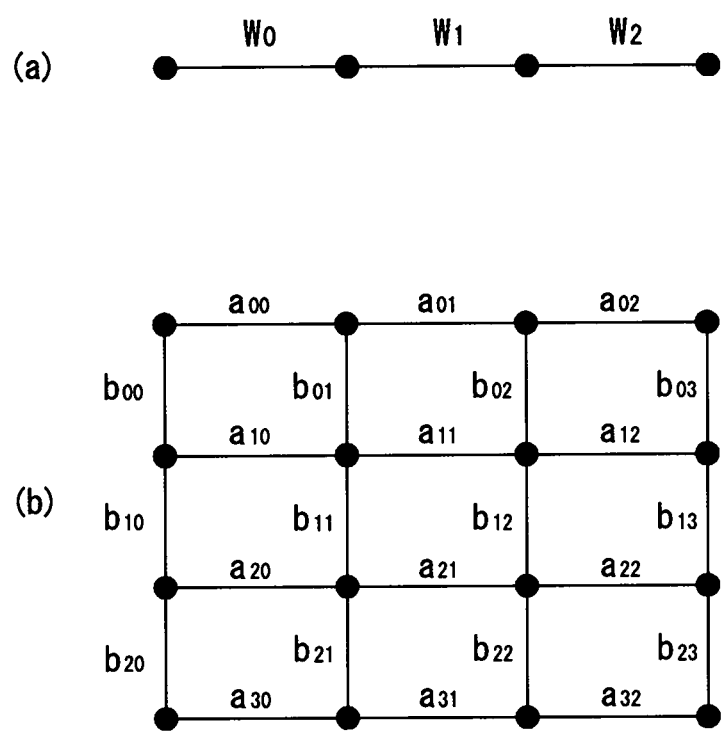
FIG. 4 is a diagram for illustrating a process of obtaining a graph-based transform matrix based on a one-dimensional graph and a two-dimensional graph, according to one embodiment of the present invention.

FIG. 4 is a diagram for illustrating a process of obtaining a graph-based transform matrix based on a one-dimensional graph and a two-dimensional graph, according to one embodiment of the present invention.

In an embodiment of the present invention, graph types that may be used for processing a pixel block in an image may be described with reference to FIG. 4. For example, FIG. 4(a) represents a one-dimensional graph corresponding to each line of the pixel bloc, while FIG. 4(b) represents a two-dimensional graph corresponding to the pixel block.

A graph vertex may be associated with each pixel in the pixel block, and a value of the graph vertex may be represented by a pixel value. Further, a graph edge may refer to a line connecting the graph vertexes. The graph edge may be used to indicate what form statistical dependence in the signal has. A value representing an intensity of the statistical dependence may be called an edge weight.

For example, referring to FIG. 4(a) which represents the one-dimensional graph, 0, 1, 2, and 3 represent positions of the vertexes respectively, and w0, w1, and w2 represent weights of edges between the vertexes respectively. Referring to FIG. 4(b) which represents the two-dimensional graph, aij (i=0,1,2,3, j=0,1,2) and bkl (k=0,1,2, l=0,1,2,3) represent weights of edges between the vertexes respectively.

Each vertex may be connected to any other vertexes. An edge weight of zero may be assigned to an edge that connects non-associated or weakly-associated vertices. However, for simplicity of presentation, an edge with the edge weight of zero may be completely eliminated.

In an embodiment of the present invention, a transform obtained from a graph signal may be defined as a graph-based transform (hereinafter, 'GBT'). For example, provided that the relationship information between pixels constituting a TU is represented by a graph, the transform obtained from this graph may be referred to as the GBT.

The relationship information between the pixels may be defined in various ways. For example, the relationship information between the pixels may be defined based on similarities among pixel values of the pixels, based on whether the pixels belong to the same PU, based on whether the pixels belong to the same object, and the like. The inter-pixel relationship information may be defined based on edge presence/absence between the pixels and edge weight values between the pixels when each of the pixels is matched to the vertex of the graph In this case, the GBT may be obtained through a following process. For example, the encoder or decoder may obtain number of graph information from a target block in a video signal. From the obtained graph information, a Laplacian matrix L may be obtained using a following equation 1:

$$L=D-A$$ [Equation 1]

where D represents a diagonal matrix, and A represents an adjacency matrix.

Then, the Laplacian matrix L may be subjected to eigen decomposition expressed as a following equation 2 to acquire a GBT kernel:

$$L=U\Lambda U^T$$ [Equation 2]

where L represents a Laplacian matrix, U represents an eigen matrix, and $U^T$ represents a transpose matrix. In the equation 2, the eigen matrix U may provide a graph-based Fourier transform that is specific to a signal matching a corresponding graph model. For example, the eigen matrix U, which satisfies the equation 2, may mean a GBT kernel.

Figure 5:
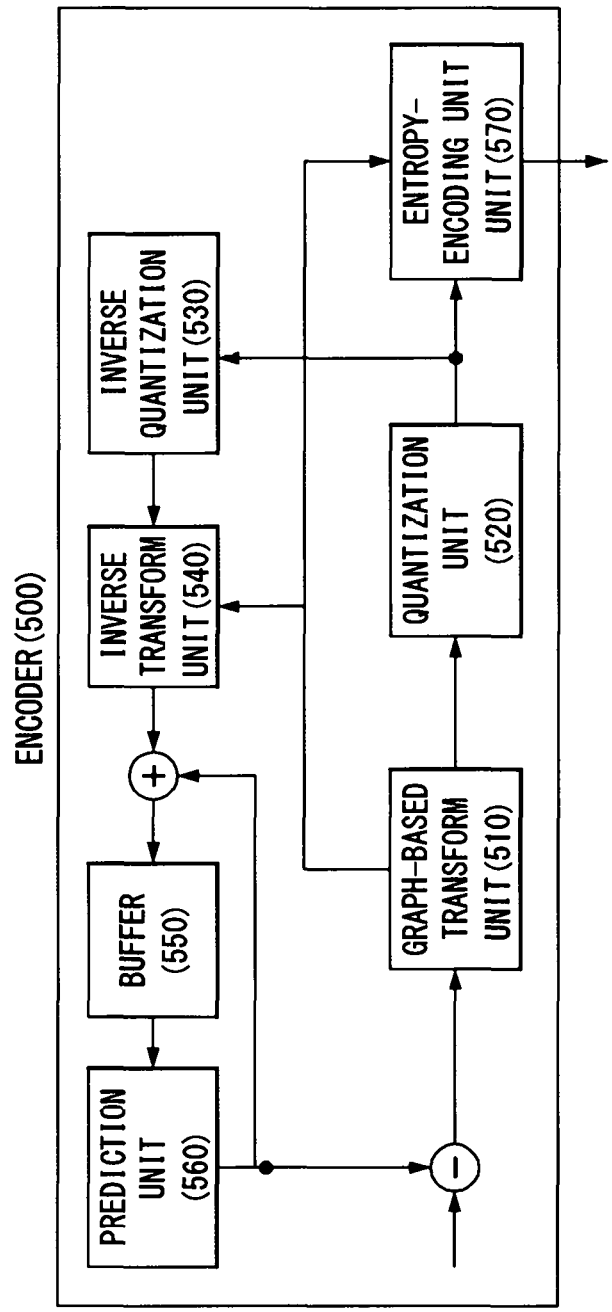
FIG. 5 illustrates a schematic block diagram of an encoder that processes graph-based signals, in accordance with one embodiment of the present invention.

FIG. 5 illustrates a schematic block diagram of an encoder that processes graph-based signals, in accordance with one embodiment of the present invention.

A well-known transforming method depending on signal characteristics is to use KLT (Karhunen-Loveve Transform). However, orthogonal matrices that perform KLT require a large number of bits, and the KLT is a method that is well adapted to signal characteristics. Thus, using the KLT, the compression efficiency is substantially reduced unless the KLT is temporarily updated.

Therefore, the present invention attempts to solve this problem via graph signal processing. In this case, the video signal may be represented as a graph showing an inter-sample signal relationship.

Furthermore, in order to solve the above problem, an edge-adaptive transform (hereinafter referred to as EAT) may be used. However, this EAS also has the problem that signaling for an edge signal in the decoder is too complicated. Thus, the present invention addresses this problem by defining a template graph set that uses some statistical properties of a residual signal.

In the video coding configurations as in FIG. 1 and FIG. 2, a fixed transform, such as DCT, may be used. This assumes that all residual signals implicitly have the same isotropic statistical properties.

However, it may be seen that, in reality, there are very different distributions in terms of video type and pixel block predictions. Therefore, in accordance with the present invention, following assumptions may be made for achieving optimization for complexity and adaptability. However, the present invention is not limited thereto.

First, in accordance with the present invention, a specific linear transform may be selected to be adaptively applied to each video block matching statistical characteristics; and Second, an overhead for transmitting transform matrix data and selecting the transform is relatively small compared to all coding gains.

Based on those assumptions, the present invention provides adaptive transform with a low complexity based on the graph-based transform template, thereby to achieve the optimization for complexity and adaptability. For example, the graph-based transform template in accordance with the present invention may be designed by considering statistical characteristics of an inter-predicted residual signal.

Referring to FIG. 5, an encoder 500 in accordance with the present invention may include a graph-based transform unit 510, a quantization unit 520, an inverse quantization unit 530, an inverse transform unit 540, a buffer 550, a prediction unit 560, and an entropy-encoding unit 570.

The encoder 500 may receive a video signal and subtracts a predicted signal output from the prediction unit 560 from the video signal to generate a residual signal. The generated residual signal may be transmitted to the graph-based transform unit 510. The graph-based transform unit 510 may generate a transform coefficient by applying a transform to the residual signal.

For example, the graph-based transform unit 510 may generate at least one data cluster for the video data, generate at least one graph laplacian matrix corresponding thereto, and perform a transform optimization based on multiple graph-based models including the at least one graph laplacian matrix to generate an optimized transform matrix. Here, the graphs corresponding to the multiple graph-based models may be generated through the following embodiments.

Also, in another embodiment of the present invention, an adaptive low complexity GBT template set may be used to utilize statistical characteristics of the residual signal. The terms as used herein, such as, a GBT template, a graph template, a template graph, a GBT template set, a graph template set, or a template graph set, etc. may be generic terms selected to illustrate the present invention and therefore may be appropriately substituted and interpreted in each coding process.

The graph-based transform unit 510 may extract graph parameters in a graph corresponding to a target unit in the residual signal. For example, the graph parameter may include at least one of a vertex parameter, and an edge parameter. The vertex parameter includes at least one of vertex positions and the number of vertexes. The edge parameter may include at least one of edge weight values and the number of edge weights. Further, the graph parameter may be defined as a set of a certain number of parameters. For example, the edge parameter set may be defined as a weight matrix.

The graph-based transform unit 510 may generate a graph based on the extracted graph parameter.

In accordance with the present invention, the generated graph may be set to a base template. Hereinafter, it will be called a base template graph. For example, the base template graph may be a uniformly weighted graph. In this case, the uniformly weighted graph may be expressed as $G_{uni}$. The nodes of the graph correspond to the pixels of the target unit. All edge weights of the target unit may be set to $W_{uni}$.

In addition, in accordance with the present invention, T different graphs may be generated by adjusting the edge weight set of the base template graph. Hereinafter, the T different graphs may be called a template graph set, which may be expressed using a following Equation 3:

$$\{\mathcal{G}_t\}_{t=1}^{T} \qquad \text{[equation 3]}$$

Additionally, in accordance with the present invention, a block-adaptive template graph may be generated by reducing weights of edges around corners in a transform block. For example, the edges around the corners in the transform block may be set to $W_{weak}$, which is an edge weight smaller than $W_{uni}$. In this case, $W_{weak}$ may indicate a weak edge weight.

Furthermore, in accordance with the present invention, the complexity may be reduced by allowing the edges around the corners in the transform block to have the same weak edge weight value $W_{weak}$.

Moreover, in accordance with the present invention, in order to reflect the signal characteristics adaptively based on different positions of the residual blocks, there is provided a method to select T different graphs as a template graph set. Further, in accordance with the present invention, a GBT may be acquired by applying spectral decomposition to the selected template graph set.

The quantization unit 520 may quantize the generated transform coefficient and transmit the quantized coefficient to the entropy-encoding unit 570.

The entropy-encoding unit 570 may perform entropy coding on the quantized signal and output an entropy-coded signal.

The quantized signal output by the quantization unit 520 may be used to generate a prediction signal. For example, the inverse quantization unit 530 and the inverse transform unit 540 in the loop of the encoder 500 may perform inverse quantization and inverse transform on the quantized signal so that the quantized signal is reconstructed as a residual signal. A reconstructed signal may be generated by adding the reconstructed residual signal to the prediction signal output from the prediction unit 560.

The buffer 550 may store therein the reconstructed signal for further reference by the prediction unit 560.

The prediction unit 560 may generate the prediction signal using the previously reconstructed signal stored in the buffer 550. In this case, the present invention relates to efficiently predicting a region in a target image using a region in an anchor image. In this case, the anchor image may refer to a reference image, a reference picture, or a reference frame. The efficiency may be determined by calculating a mean square error that quantifies a rate-distortion cost or distortion in the residual signal.

The present invention proposes a method of identifying vertices and edges in the graph and encoding or decoding a residual value signal. For example, embodiments of the present invention may implement various embodiments via the graph-based transform unit 510. The graph-based transform unit 510 may be included in the encoder 500 or the decoder 700.

Figure 6:
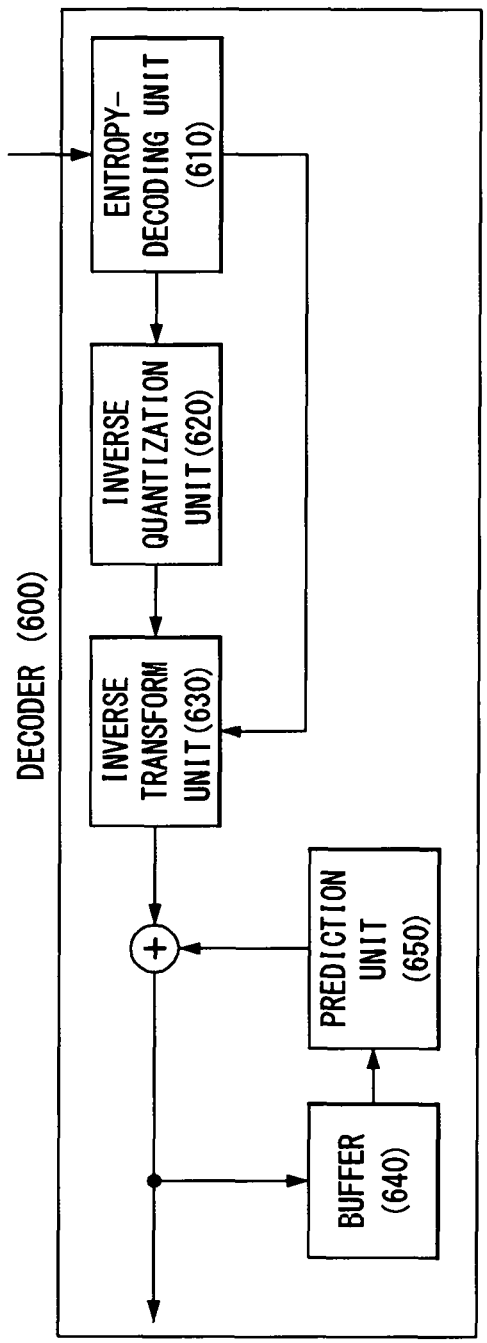
FIG. 6 illustrates a schematic block diagram of a decoder that processes graph-based signals, in accordance with one embodiment of the present invention.

FIG. 6 illustrates a schematic block diagram of a decoder that processes graph-based signals, in accordance with one embodiment of the present invention.

Referring to FIG. 6, a decoder 600 may receive the signal output from the encoder 500 as shown in FIG. 5. The decoder 600 may include an entropy-decoding unit 610, an inverse quantization unit 620, an inverse transform unit 630, a buffer 640 and a prediction unit 650.

The entropy-decoding unit 610 may performs entropy-decoding on the received signal. The inverse quantization unit 620 may obtain a transform coefficient from the entropy-decoded signal based on information on the quantization step size.

The inverse transform unit 630 may acquire a residual signal by performing an inverse transform on the transform coefficient. In this case, the inverse transform may refer to an inverse transform for the graph-based transform obtained from the encoder 500.

In an embodiment of the present invention, the inverse transform unit 6'30 may receive a template index representing a graph-based transform template and obtain a graph-based transform kernel corresponding to the template index. A transform unit may be reconstructed using the acquired graph-based transform kernel. Here, the graph-based transform kernel may represent a transform kernel optimized based on multiple graph-based models.

By adding the residual signal to the prediction signal output from the prediction unit 650, the reconstructed signal may be generated.

The buffer 640 may store therein the reconstructed signal for further reference by the prediction unit 650.

The prediction unit 650 may generate the prediction signal based on the previously reconstructed signal stored in the buffer 640.

Figure 7:
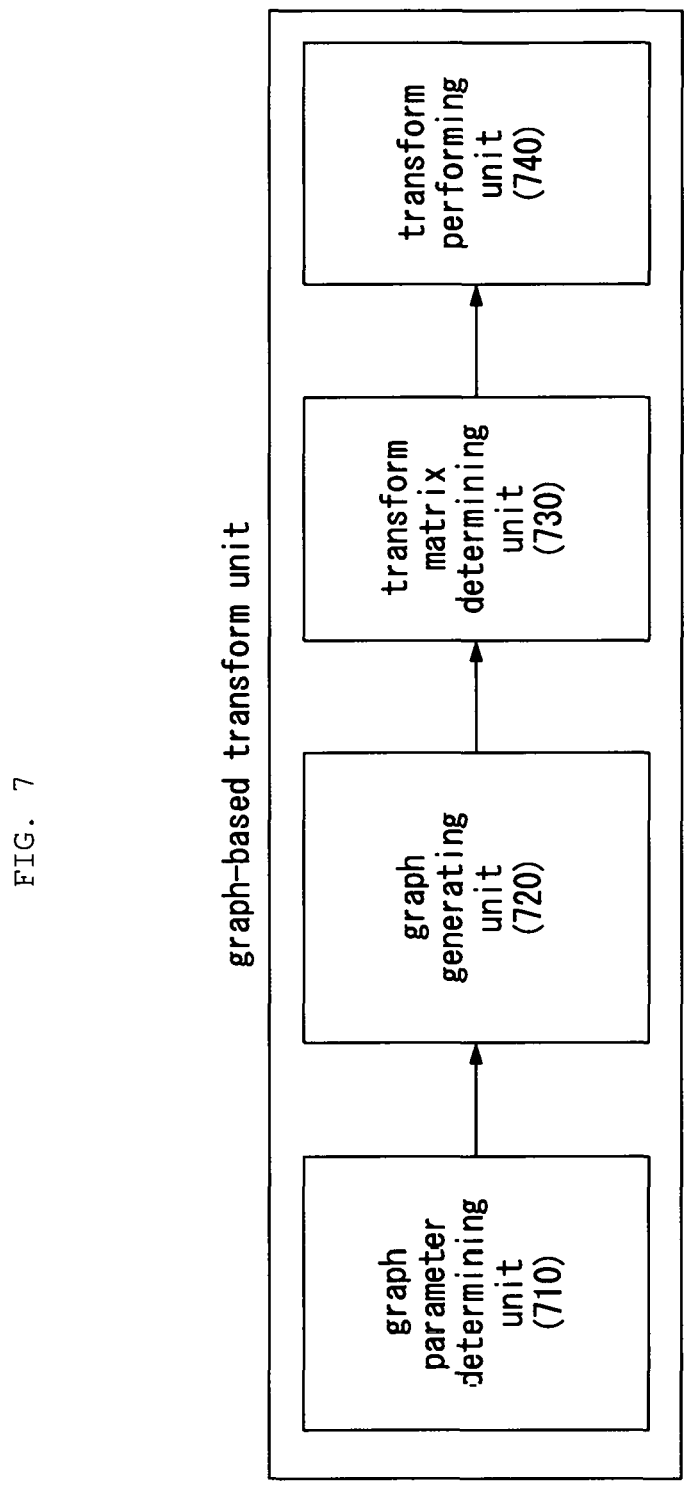
FIG. 7 is an internal block diagram of a graph-based transform unit which performs a graph-based transform according to an embodiment of the present invention.

FIG. 7 is an internal block diagram of a graph-based transform unit which performs graph-based transform according to an embodiment of the present invention.

Referring to FIG. 7, the graph-based transform unit may include a graph parameter determining unit 710, a graph generating unit 720, a transform matrix determining unit 730, and a transform performing unit 740.

The graph parameter determining unit 710 may extract a graph parameter in a graph corresponding to a target unit of a video signal or a differential signal. For example, the graph parameter may include at least one of a vertex parameter and an edge parameter. The vertex parameter may include at least one of a vertex position and the number of vertices, and the edge parameter may include at least one of an edge weight value and the number of edge weight values. Also, the graph parameter may be defined as a predetermined number of sets.

According to an embodiment of the present invention, the graph parameter extracted by the graph parameter determining unit 710 may be expressed in a generalized form.

The graph generating unit 720 may generate a graph signal based on the graph parameter extracted by the graph parameter determining unit 710. Here, the graph signal may include a weighted or non-weighted line graph. The line graph may be generated for each row or column of a target block.

The transform matrix determining unit 730 may determine a transform matrix appropriate for the graph signal. For example, the transform matrix may be determined based on rate distortion (RD) performance. Also, the transform matrix in this disclosure may also be expressed as transform or transform kernel.

In an embodiment of the present invention, the transform matrix may be a value already determined in the encoder and decoder, and here, the transform matrix determining unit 730 may derive a transform matrix appropriate for the graph signal from a storage area.

In another embodiment of the present invention, the transform matrix determining unit 730 may generate one-dimensional (1D) transform kernels for a line graph and combine two of the one-dimensional transform kernels to generate a two-dimensional (2D) separable graph-based transform kernel. The transform matrix determining unit 730 may determine a transform kernel appropriate for the graph signal, among the 2D separable graph-based transform kernels based on RD (Rate Distortion) performance.

The transform performing unit 740 may perform transform using the transform matrix obtained by the transform matrix determining unit 730.

Referring to FIG. 7, in this disclosure, each functional section is described in detail to explain the process of performing the graph-based transform, but the present invention is not limited thereto. For example, the graph-based transform unit may include a graph generating unit and a transform unit, and in this case, the function of the graph parameter determining unit 710 may be performed by the graph generating unit, and the function of the transform performing unit 740 may be performed in the transform unit. The function of the transform unit may be divided into a transform matrix determining unit and a transform performing unit.

Figure 8:
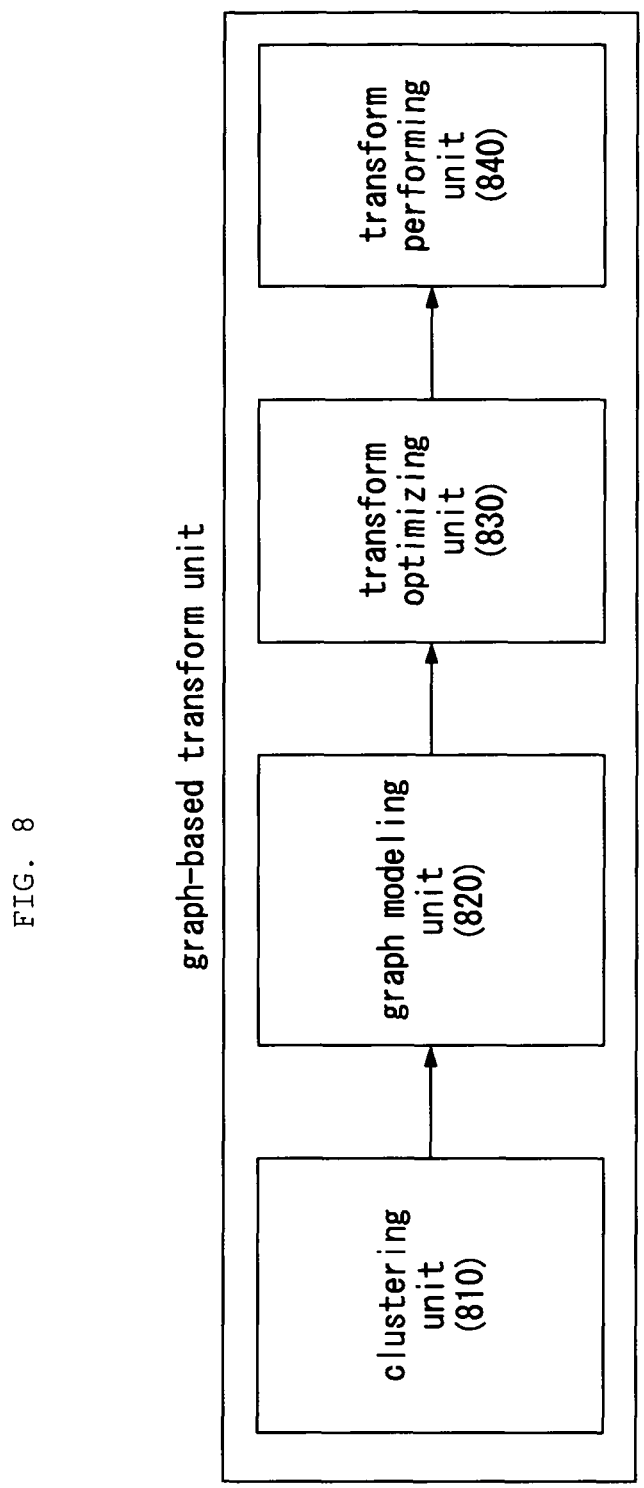
FIG. 8 is an internal block diagram of a graph-based transform unit which performs a transform optimization based on multiple graph models, according to an embodiment of the present invention.

FIG. 8 is an internal block diagram of a graph-based transform unit which performs a transform optimization based on multiple graph models, according to an embodiment of the present invention.

Referring to FIG. 8, the graph-based transform unit may include a clustering unit 810, a graph modeling unit 820, a transform optimizing unit 830, and a transform performing unit 840.

The clustering unit 810 may perform a clustering on input video data to generate at least one data cluster. Here, the clustering may be performed based on a prediction mode. For example, if the prediction mode is an intra-prediction mode, the at least one data cluster represents intra-residual data for the intra-prediction mode. Alternatively, if the prediction mode is an inter-prediction mode, the at least one data cluster represents inter-residual data for the inter-prediction mode.

The graph modeling unit 820 may generate multiple graph-based models corresponding to the data clusters and generate a graph laplacian matrix corresponding to the multiple graph-based models. Here, each of the multiple graph-based models may be generated for the intra-prediction mode.

The transform optimizing unit 830 may perform transform optimization based on the multiple graph-based models. Here, the transform optimization may be performed based on a specified metric, and the specified metric may minimize squared sum of off-diagonal elements. Here, the specified metric may be a Laplacian metric or an inverse Laplacian metric.

In an embodiment, the transform optimizing unit 830 may include at least one of a transform initializing unit (not shown), a transform selecting unit (not shown), and a transform updating unit (not shown). The transform initializing unit (not shown) initializes a transform matrix, and the transform selecting unit (not shown) may select two basic vectors of the transform matrix. The transform updating unit (not shown) may update the two basic vectors based on the specified metric. Through this process, the transform optimizing unit 830 may perform a transform optimization.

The transform performing unit 840 may perform a transform using an optimized transform matrix generated according to a result of the transform optimization.

Figure 9:
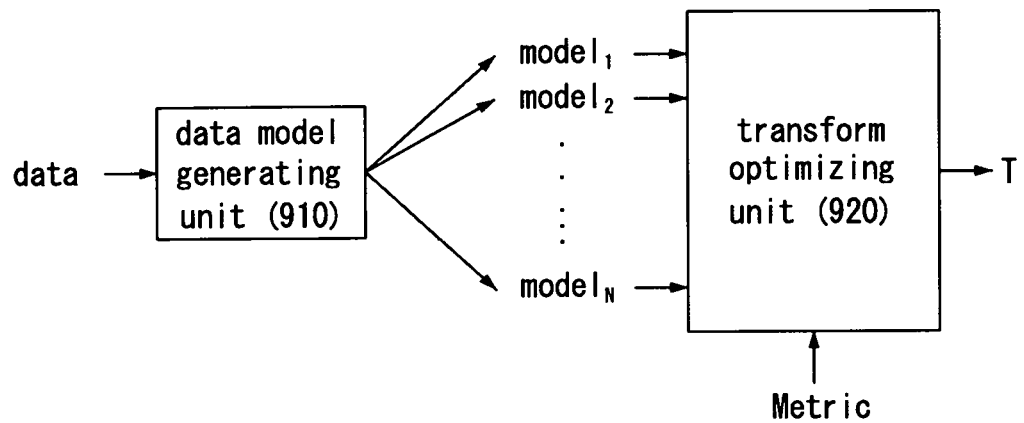
FIG. 9 is a block diagram illustrating how to generate multiple graph models and perform a transform optimization based on the generated multiple graph models according to an embodiment of the present invention.

FIG. 9 is a block diagram illustrating how to generate multiple graph models and perform transform optimization based on the generated multiple graph models according to an embodiment of the present invention.

The present invention provides a method for designing robust transforms using graph-based representations and enables construction of an optimized transform applicable to a range of statistical graph models for a given robust metric of interest.

In general, transforms are obtained based on a single model. In actuality, however, a single model is difficult to adaptively process features of a complex video signal.

Thus, the present invention may solve this problem by defining multiple graph models and using more adaptive transforms.

Referring to FIG. 9, the encoder to which the present invention is applied may include at least one of a data model generating unit 910 and a transform optimizing unit 920. These units need not necessarily be included in the encoder, and externally stored information or predefined information in the encoder may be used.

When video data is input, the data model generating unit 910 may generate a data model corresponding to the video data. The data model generating unit 910 may generate multiple data models using a given metric. For example, the data model generating unit 910 may generate N number of data models $model_1, model_2, \ldots, model_N$ corresponding to the video data. The N number of data models generated thusly may be transmitted to the transform optimizing unit 920.

The transform optimizing unit 920 receives the N number of data models and may generate a transform kernel optimized for each data model. The optimized transform kernel may be used to transform the video data.

Figure 10:
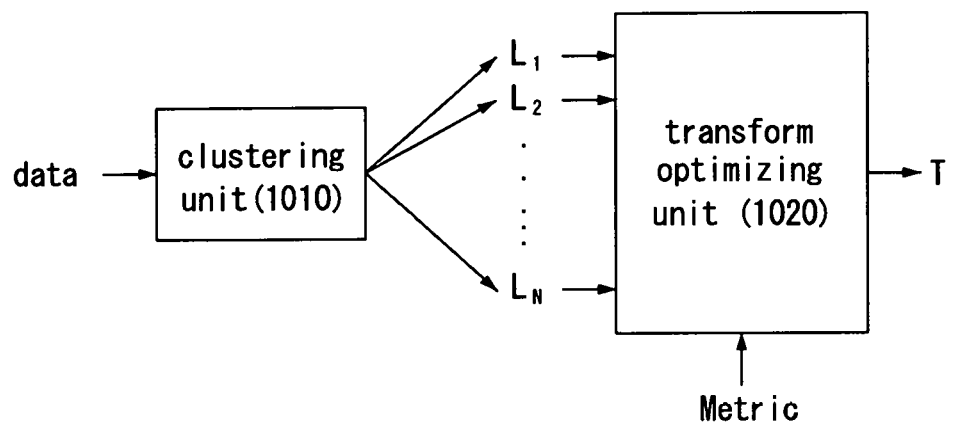
FIG. 10 is a block diagram illustrating how to perform a transform optimization using a graph laplacian matrix corresponding to a data cluster according to an embodiment of the present invention.

FIG. 10 is a block diagram illustrating how to perform a transform optimization using a graph laplacian matrix corresponding to a data cluster according to an embodiment of the present invention.

Referring to FIG. 10, the encoder to which the present invention is applied may include at least one of a clustering unit 1010, a graph modeling unit (not shown), and a transform optimizing unit 1020. These units need not necessarily be included in the encoder, and externally stored information or predefined information in the encoder may be used.

The clustering unit 1010 may perform a clustering on input video data. As a result of the clustering, the clustering unit 1010 may generate at least one data cluster. For example, the clustering unit 1010 may generate N number of data clusters.

In an embodiment of the present invention, the clustering may be performed based on a prediction mode. For example, if the prediction mode is an intra-prediction mode, the at least one data cluster represents intra-residual data for the intra-prediction mode. Alternatively, when the prediction mode is an inter-prediction mode, the at least one data cluster represents inter-residual data for the inter-prediction mode.

The graph modeling unit (not shown) may generate multiple graph-based models corresponding to data clusters and may generate a graph laplacian matrix corresponding to the multiple graph-based models. For example, the graph modeling unit (not shown) may generate N number of graph laplacian matrices $L_1, L_2, \ldots, L_N$ for N number of data clusters output from the clustering unit 1010.

In an embodiment of the present invention, each of the multiple graph-based models may be generated for the prediction mode. Also, the multiple graph based models may be predefined models.

The transform optimizing unit 920 may generate an optimized transform matrix T by updating the transform matrix based on a specified metric. Here, the specified metric may be a Laplacian metric or an inverse Laplacian metric.

Figure 11:
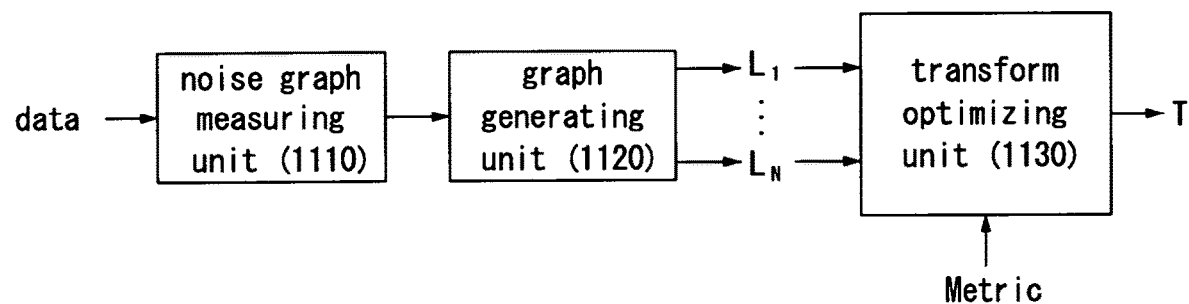
FIG. 11 is a block diagram illustrating how to perform a transform optimization using a graph generated based on a noise graph according to an embodiment of the present invention.

FIG. 11 is a block diagram illustrating how to perform a transform optimization using a graph generated based on a noise graph according to an embodiment of the present invention.

Referring to FIG. 11, the encoder to which the present invention is applied may include at least one of a noise graph measuring unit 1110, a graph generating unit 1120, and a transform optimizing unit 1130. These units need not necessarily be included in the encoder, and externally stored information or predefined information in the encoder may be used.

The noise graph measuring unit 1110 may measure a noise graph from input video data.

The graph generating unit 1120 may generate N number of graphs stochastically related to the measured noise graph. Also, the graph generating unit 1120 may generate N number of graph laplacian matrices $L_1, L_2, \ldots, L_N$ corresponding to the N number of graphs. Here, N may be dependent on a type of application and requirements and may be, for example, N=1, 2, 17, 127, 1954, . . . .

The transform optimizing unit 1130 may generate an optimized transform matrix T by updating the transform matrix based on the specified metric. Here, the specified metric may be a Laplacian metric or an inverse Laplacian metric.

Figure 12:
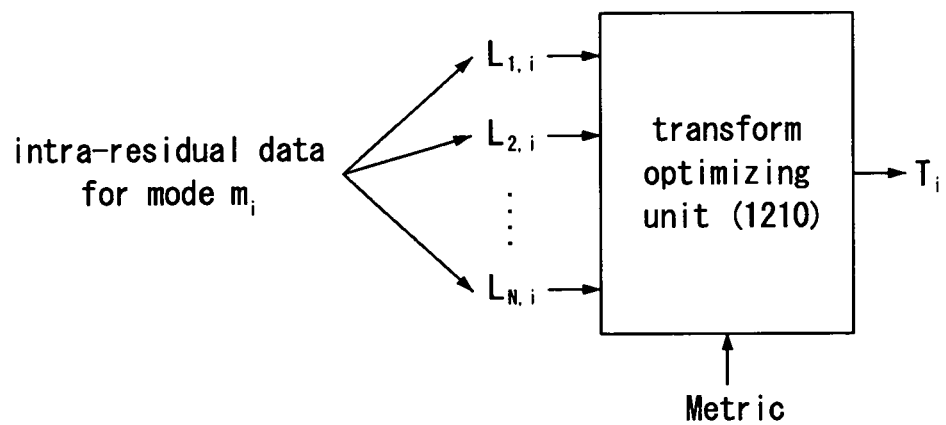
FIG. 12 is a block diagram illustrating how to perform a transform optimization using data clusters respectively corresponding to intra-prediction modes according to an embodiment of the present invention.

FIG. 12 is a block diagram illustrating how to perform a transform optimization performed using data clusters respectively corresponding to intra-prediction modes according to an embodiment of the present Invention.

Referring to FIG. 12, the encoder to which the present invention is applied may include at least one of a clustering unit (not shown), a graph modeling unit (not shown), and a transform optimizing unit 1210. These units need not necessarily be included in the encoder, and externally stored information or predefined information in the encoder may be used.

The clustering unit (not shown) may perform a clustering on input video data based on the prediction mode. The clustering unit (not shown) may generate N number of data clusters for the prediction mode $m_i$. For example, the prediction mode may be an intra-prediction mode or an inter-prediction mode. If the prediction mode is the intra-prediction mode, the video data represents intra-residual data for the intra-prediction mode mi. For example, if the number of intra-prediction modes is 35, i may be 1, 2, . . . , 35.

The graph modeling unit (not shown) may generate N number of multiple graph-based models corresponding to intra-residual data for the intra-prediction mode mi, and generate graph laplacian metrics corresponding to the N number of multiple graph-based models. Here, the graph laplacian matrices corresponding to the N number of multiple graph-based models may be expressed as $L_{1,i}, L_{2,i}, \ldots, L_{N,i}$.

The transform optimizing unit 1210 may generate an optimized transform matrix T by updating the transform matrix based on the specified metric.

Figure 13:
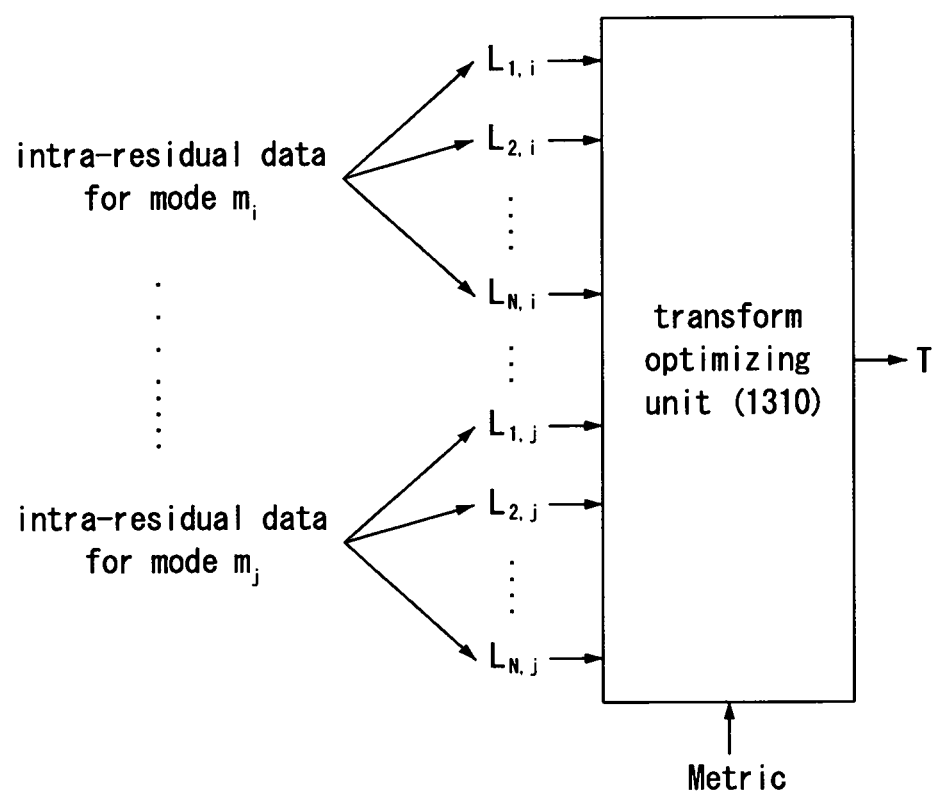
FIG. 13 is a block diagram illustrating how to perform a transform optimization using data clusters according to a plurality of intra-prediction modes according to an embodiment of the present invention.

FIG. 13 is a block diagram illustrating how to perform a transform optimization performed using data clusters according to a plurality of intra-prediction modes according to an embodiment of the present invention.

Referring to FIG. 13, the encoder to which the present invention is applied may include at least one of a first clustering unit (not shown), a second clustering unit (not shown), a graph modeling unit (not shown), and a transform optimizing unit 1310. These units need not necessarily be included in the encoder, and externally stored information or predefined information in the encoder may be used.

The first clustering unit (not shown) may generate N number of data clusters for the prediction mode mi. For example, if the prediction mode is the intra-prediction mode, the first clustering unit (not shown) may generate N number of data clusters for intra-residual data for the first intra-prediction mode mi. Here, when the number of intra-prediction modes is 35, i may be 1, 2, . . . , 35.

The second clustering unit (not shown) may also generate N number of data clusters for the prediction mode rm. For example, if the prediction mode is the intra-prediction mode, the second clustering unit (not shown) may generate N number of data clusters for intra-residual data for the second intra-prediction mode $m_j$. Here, the second intra-prediction mode $m_j$ may have a value different from the first intra-prediction mode $m_i$.

The graph modeling unit (not shown) may generate N number of multiple graph-based models corresponding to intra-residual data for the first intra-prediction mode $m_i$ and generate graph laplacian matrices corresponding to the N number of multiple graph-based models. Here, the graph Laplacian matrices corresponding to the N number of multiple graph-based models may be expressed as $L_{1,i}$, $L_{2,i}, \ldots, L_{N,i}$.

The graph modeling unit (not shown) may generate N number of multiple graph-based models corresponding to intra-residual data for the second intra-prediction mode $m_j$ and generate graph laplacian matrices corresponding to N number of multiple graph-based models. Here, the graph laplacian matrices corresponding to the N number of multiple graph-based models may be expressed as $L_{1,j}$, $L_{2,j}, \ldots, L_{N,j}$.

Also, the graph modeling unit (not shown) may generate N number of multiple graph-based models corresponding to intra-residual data for the first intra-prediction mode $m_i$ and intra-residual data for the second intra-prediction mode $m_i$ and generate graph laplacian matrices corresponding to the N number of multiple graph-based models. Here, the graph laplacian matrices corresponding to the N number of multiple graph-based models may be expressed as $L_{1,i,j}$, $L_{2,i,j}, \ldots, L_{N,i,j}$.

For example, a plurality of prediction modes (intra-DC mode and intra-planar mode) may be used to generate one transform. Also, at least two or more of the prediction modes may be grouped and used to generate one transform.

The transform optimizing unit 1210 may generate an optimized transform matrix T by updating the transform matrix based on a specified metric. Here, the specified metric may be a Laplacian metric or an inverse Laplacian metric. For example, the transform optimizing unit 1210 may generate an optimized transform matrix T corresponding to a plurality of prediction modes through an optimization process.

Figure 14:
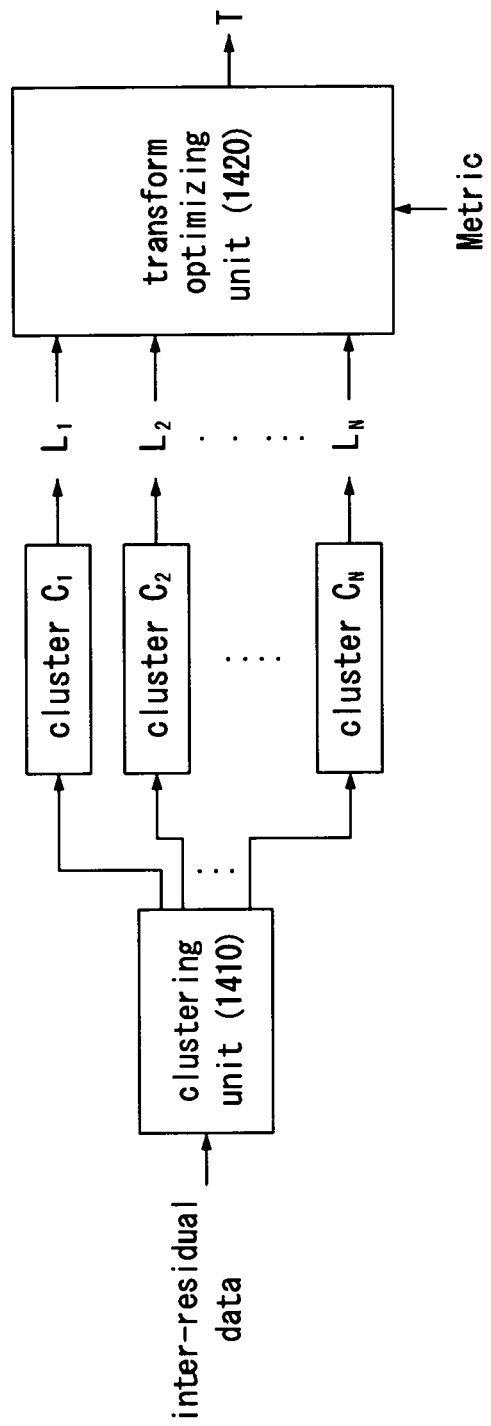
FIG. 14 is a block diagram illustrating how to perform a transform optimization using data clusters respectively corresponding to inter-prediction modes according to an embodiment of the present invention.

FIG. 14 is a block diagram illustrating how to perform a transform optimization performed using data clusters respectively corresponding to inter-prediction modes according to an embodiment of the present invention.

Referring to FIG. 14, the encoder to which the present invention is applied may include at least one of a clustering unit 1410, a graph modeling unit (not shown), and a transform optimizing unit 1420. These units need not necessarily be included in the encoder, and externally stored information or predefined information in the encoder may be used.

The clustering unit 1410 may perform a clustering on input video data based on a prediction mode. The clustering unit (not shown) may generate N number of data clusters for the prediction mode $m_i$. Here, the N number of data clusters may be expressed as $C_1, C_2, \ldots, C_N$. For example, when the prediction mode is the inter-prediction mode, the video data is inter-residual data for the inter-prediction mode.

The clustering may be performed in various manners using different difference metrics or similarity metrics. For example, clustering may be performed based on low-level processing of residual data. Here, the low-level processing may include edge detection, energy variation estimation, and the like. In addition, boundary information such as a direction, a position, and sharpness may be used in the similarity metric determining similarity, and a K-means algorithm may be used to cluster data.

The graph modeling unit (not shown) may generate N number of multiple graph-based models corresponding to the inter-residual data for the inter-prediction mode and generate a graph laplacian matrix corresponding to the N number of multiple graph-based models. Here, the graph laplacian matrix corresponding to the N number of multiple graph-based models may be expressed as $L_1, L_2, \ldots, L_N$.

The transform optimizing unit 1420 may generate an optimized transform matrix T by updating the transform matrix based on the specified metric. Here, the specified metric may be a Laplacian metric or an inverse Laplacian metric. For example, the transform optimizing unit 1420 may generate the optimized transform matrix T corresponding to the inter-prediction mode through the optimization process.

Figure 15:
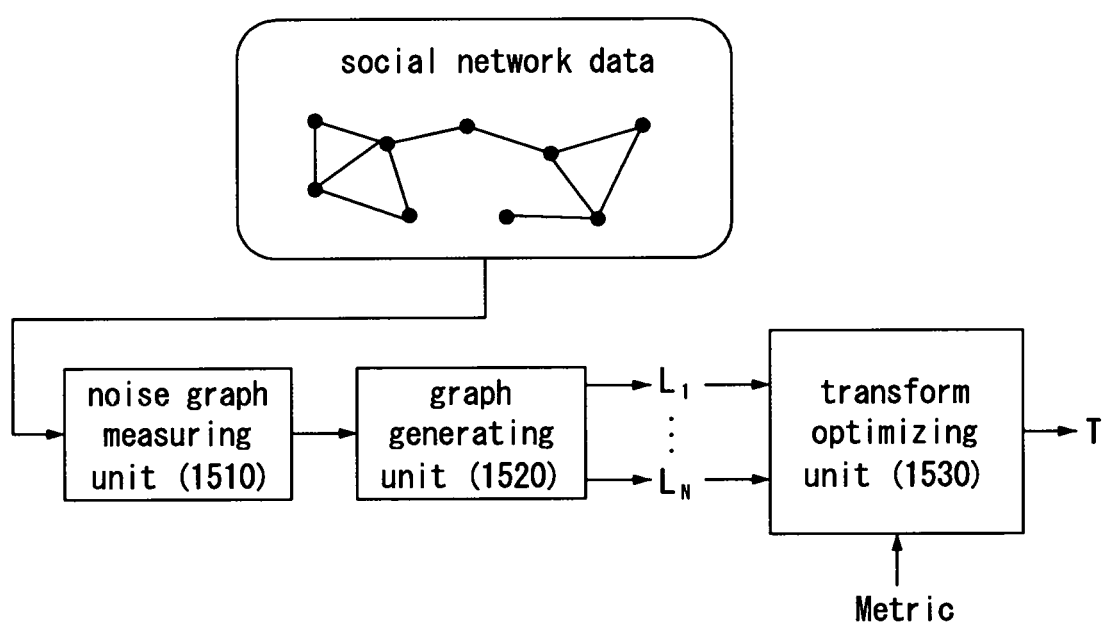
FIG. 15 is a block diagram illustrating how to perform a transform optimization using a graph generated based on a noise graph extracted from a social network according to an embodiment of the present invention.

FIG. 15 is a block diagram illustrating how to perform a transform optimization performed using a graph generated based on a noise graph extracted from a social network according to an embodiment of the present invention.

Referring to FIG. 15, the encoder to which the present invention is applied may include at least one of a noise graph measuring unit 1510, a graph generating unit 1520, and a transform optimizing unit 1530. These units need not necessarily be included in the encoder, and externally stored information or predefined information in the encoder may be used.

The noise graph measuring unit 1510 may measure a noise graph from graph-based social network data. For example, the graph-based social network data may include an age of an individual, an income of the individual, his/her friend network data, and the like.

In an embodiment, a time varying nature of a social network may derive a noisy graph model in which link weights are randomly distributed.

The graph generating unit 1520 may generate N number of graphs stochastically related to the measured noise graph. Also, the graph generating unit 1520 may generate N number of graph laplacian matrices $L_1, L_2, \ldots, L_N$ corresponding to the N number of graphs. Here, N may be dependent on a type of an application and requirements.

In an embodiment, the graph generating unit 1520 may use variance and/or tolerance measures to generate some outputs of the noise graph through random sampling.

The transform optimizing unit 1130 may generate an optimized transform matrix T by updating the transform matrix based on a specified metric. Here, the specified metric may be a Laplacian metric or an inverse Laplacian metric.

Figure 16:
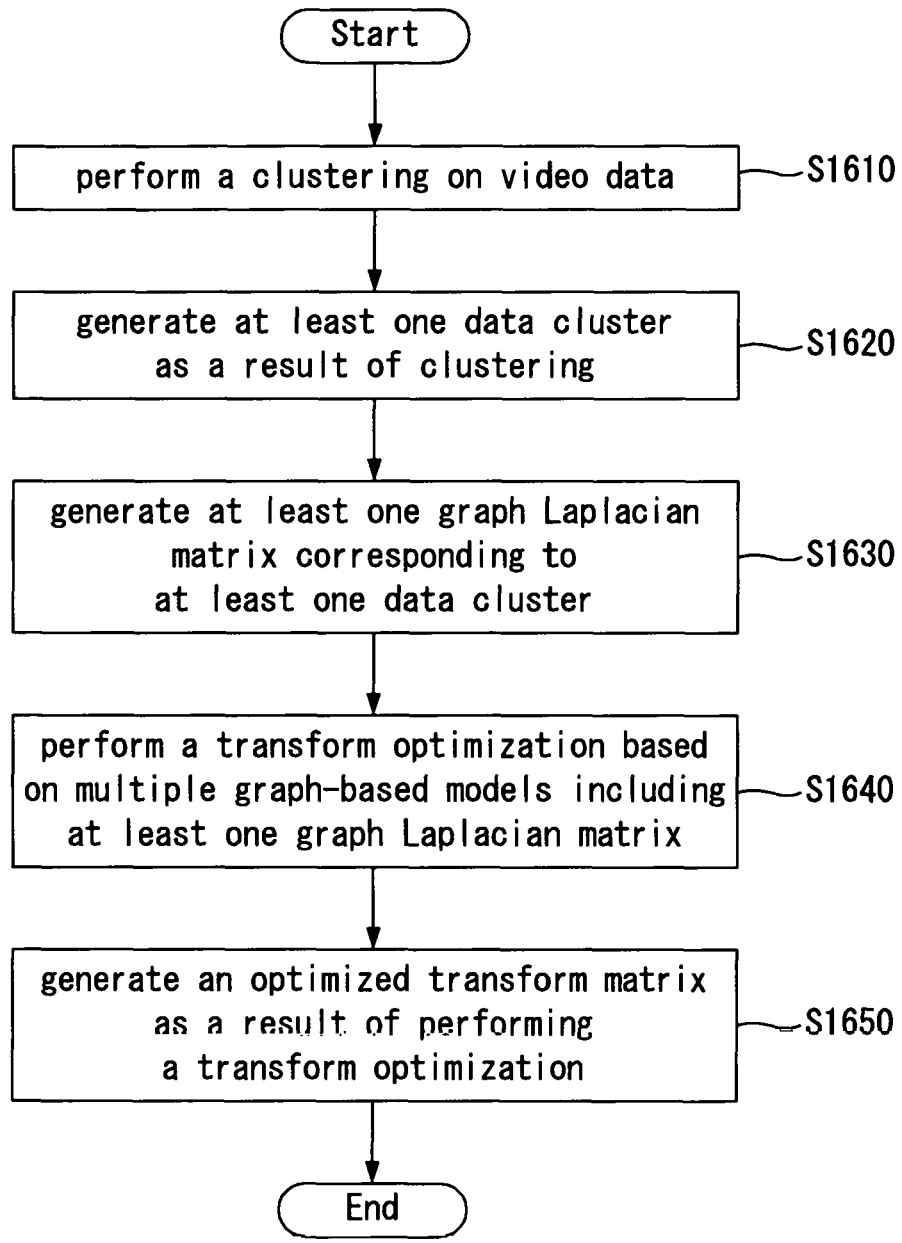
FIG. 16 is a flowchart illustrating a method of performing a transform optimization based on multiple graph-based models according to an embodiment of the present invention.

FIG. 16 is a flowchart illustrating a method of performing a transform optimization based on multiple graph-based models according to an embodiment of the present invention.

The present invention provides a method for performing transform optimization based on multiple graph-based models.

The encoder to which the present invention is applied may perform a clustering on input video data (S1610).

As a result of the clustering, the encoder may generate at least one data cluster (S1620). Here, the clustering may be performed based on a prediction mode. For example, if the prediction mode is an intra-prediction mode, the at least one data cluster represents intra-residual data for the intra-prediction mode. Alternatively, when the prediction mode is an inter-prediction mode, the at least one data cluster represents inter-residual data for the inter-prediction mode.

The encoder may generate multiple graph-based models corresponding to data clusters and may generate at least one graph laplacian matrix corresponding to the multiple graph-based models (S1630).

The encoder may perform transform optimization based on the multiple graph-based models (S1640). Here, the transform optimization may be performed based on a specified metric, and the specified metric may minimize the squared sum of off-diagonal elements. Here, the specified metric may be a Laplacian metric or an inverse Laplacian metric.

The encoder may generate an optimized transform matrix according to a result of performing the transform optimization (S1650). Also, the encoder may perform transform using the optimized transform matrix.

Hereinafter, a process of obtaining an optimized transform matrix will be described in detail.

First, it is assumed that each class has N number of different data classes based on the graph laplacian matrices $L_1, L_2, \ldots, L_N$. The present invention is to obtain an optimized transform T based on a specified metric.

In an embodiment of the present invention, the transform optimization minimizes the squared sum of off-diagonal elements as expressed in Equation (4).

$$T^* = \underset{\{T|TT^t=1\}}{\operatorname{argmin}} \sum_{i=1}^{N} \|d\operatorname{diag}(TL_iT^t) - TL_iT^t\|_F^2 \quad \text{[Equation 4]}$$

Here, the operator $d\operatorname{diag}(TL_iT^t)$ generates a diagonal matrix from the diagonal components of the matrix $TL_iT^t$.

In an embodiment, other metrics may be used to optimize the transform matrix T. For example, $L_1^+, L_2^+ \ldots L_N^+$ respectively representing pseudo-inverse for the graph laplacian matrices $L_1, L_2, \ldots, L_N$ may be used in Equation (4), instead of the graph laplacian matrices.

In another embodiment, covariance matrices $K_1, K_2, \ldots, K_N$ may be used to model input data.

In an embodiment, Equation 5 below may be used to obtain an optimized transform T.

$$T^* = \underset{\{T|TT^t=1\}}{\operatorname{argmax}} \sum_{i=1}^{N} \log\left(\left(\frac{\det(d\operatorname{diag}(K))}{\det(d\operatorname{diag}(TKT^t))}\right)\right) \quad \text{[Equation 5]}$$

Here, the operator $d\operatorname{diag}(TKT^t)$ generates a diagonal matrix from diagonal elements of the matrix $TKT^t$, and the operator $d\operatorname{diag}(K)$ generates a diagonal matrix from the diagonal elements of the matrix K.

In another embodiment, in the present invention, the following procedure may be iteratively performed to optimize the transform T:

First, the encoder may initialize the transform matrix T. Also, the encoder may select two basic vectors $t_i$ and $t_j$ of the transform matrix. The encoder may then update the two basic vectors based on a specified metric and repeatedly perform the above steps until a predetermined convergence criterion is met.

Although the embodiments are mainly described based on the encoder, the present invention is not limited thereto. Each functional unit of the transform unit or graph-based transform unit may also be performed in the decoder, as well as in the encoder. In this case, not all the functional units of the transform unit or the graph-based transform unit described in the above embodiments are necessarily included in the decoder but only some thereof may be included, or externally stored information or predefined information in the encoder/decoder may be used.

As described above, the embodiments explained in the present invention may be implemented and performed on a processor, a micro-processor, a controller or a chip. For example, functional modules explained in FIG. 1, FIG. 2 and FIGS. 5 to 12 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of decoding a video data based on an intra-prediction mode, the method comprising:
    obtaining a model index indicating an inverse-transform matrix for a current block;
    determining an inverse-transform kernel set for the current block among pre-determined multiple inverse-transform kernel sets based on the intra-prediction mode;
    deriving the inverse-transform matrix based on the inverse-transform kernel set; and
    performing an inverse-transform for the current block based on the inverse-transform matrix,
    wherein a plurality of intra-prediction modes are grouped into one or more intra-prediction mode groups and each of the intra-prediction mode groups corresponds to a single inverse-transform kernel set, and
    wherein based on an intra-DC mode and an intra-planar mode being grouped together, the intra-DC mode and the intra-planar mode correspond to a single inverse-transform kernel set.

2. A method of encoding a video data based on an intra-prediction mode, the method comprising:
    determining a transform kernel set for a current block among pre-determined multiple transform kernel sets based on the intra-prediction mode;

deriving a transform matrix for the current block based on the transform kernel set; and generating a model index indicating the transform matrix for the current block;

wherein a plurality of intra-prediction modes are grouped into one or more intra-prediction mode groups and each of the intra-prediction mode groups corresponds to a single transform kernel set, and wherein based on an intra-DC mode and an intra-planar mode being grouped together, the intra-DC mode and the intra-planar mode correspond to a single transform kernel set.

3. A non-transitory decoder-readable medium storing picture information generated by performing the steps of:

determining a transform kernel set for a current block among pre-determined multiple transform kernel sets based on the intra-prediction mode;

deriving a transform matrix based on the transform kernel set;

performing a transform for the current block based on the transform matrix; and generating a model index indicating the transform matrix for the current block;

wherein a plurality of intra-prediction modes are grouped into one or more intra-prediction mode groups and each of the intra-prediction mode groups corresponds to a single transform kernel set, and wherein based on that an intra-DC mode and an intra-planar mode are grouped, the intra-DC mode and the intra-planar mode correspond to a single transform kernel set.

* * * * *